United States Patent
Cheatham

(10) Patent No.: US 10,217,099 B1
(45) Date of Patent: Feb. 26, 2019

(54) METHOD AND APPARATUS FOR ASSOCIATING MULTIPLE ACCOUNTS WITH ONE ACCOUNT ACCESS CARD

(71) Applicant: Intuit Inc., Mountain View, CA (US)

(72) Inventor: Alicia D. Cheatham, Allen, TX (US)

(73) Assignee: Intuit Inc., Mountain View, CA (US)

( * ) Notice: Subject to any disclaimer, the term of this patent is extended or adjusted under 35 U.S.C. 154(b) by 336 days.

(21) Appl. No.: 15/007,512

(22) Filed: Jan. 27, 2016

(51) Int. Cl.
*G06Q 20/22* (2012.01)
*G06Q 20/34* (2012.01)
*G06Q 20/40* (2012.01)

(52) U.S. Cl.
CPC ......... *G06Q 20/227* (2013.01); *G06Q 20/341* (2013.01); *G06Q 20/3572* (2013.01); *G06Q 20/409* (2013.01)

(58) Field of Classification Search
CPC .............. G06Q 20/227; G06Q 20/341; G06Q 20/3572; G06Q 20/409
See application file for complete search history.

(56) References Cited

U.S. PATENT DOCUMENTS

| | | | | |
|---|---|---|---|---|
| 5,844,230 A | * | 12/1998 | Lalonde | G06K 19/06187 235/487 |
| 5,932,869 A | * | 8/1999 | Gottlich | G06K 17/00 235/380 |
| 6,138,917 A | * | 10/2000 | Chapin, Jr. | G06K 19/06187 235/449 |
| 8,602,301 B1 | * | 12/2013 | Blossom | G06K 19/06187 235/380 |
| 2003/0069846 A1 | * | 4/2003 | Marcon | G06Q 20/105 705/41 |
| 2004/0210498 A1 | * | 10/2004 | Freund | G06Q 20/10 705/30 |
| 2007/0235524 A1 | * | 10/2007 | Little | G06Q 20/04 235/380 |
| 2014/0279476 A1 | * | 9/2014 | Hua | G06Q 20/227 705/41 |

* cited by examiner

*Primary Examiner* — William E Rankins
(74) *Attorney, Agent, or Firm* — Hawley Troxell Ennis & Hawley LLP; Philip McKay

(57) ABSTRACT

An account access card having a first side and a second side is configured for electronic funds transfer, identification, authentication, data storage, data transfer, and/or application processing, according to one embodiment. Certain embodiments of the technology provide one or more account identification components to enable the card to identify a user, access an account, receive information, and/or provide information. In various embodiments, the one or more account identification components are disposed on the account access card. The one or more account identification components store account identification data providing access to one or more accounts. In one embodiment, a first account identification component stores first account information and is disposed on the first side of the account access card. In one embodiment, a second account identification component stores second account information and is disposed on the second side of the account access card.

18 Claims, 5 Drawing Sheets

METHOD AND APPARATUS FOR ASSOCIATING MULTIPLE ACCOUNTS WITH ONE ACCOUNT ACCESS CARD

BACKGROUND

Time and time again, business owners are warned against mixing their business finances with their personal finances. A failure to keep business and personal finances separate can result in significant costs and even legal liability for the business owner. Nonetheless, many business owners use a single financial account for all business and personal transactions and then, at a later date, attempt to manually reconcile the transactions to separate business and personal ledgers. Even those business owners who maintain separate accounts and credit cards for business and personal use are often inconvenienced by the difficulty of predicting when a specific credit card will be useful and keeping that card in an accessible location. Indeed, even organized business owners often face situations where they need to make a purchase for a business, but only have personal credit cards in their wallets.

For example, a business owner may stop into an office supply store to pick up school supplies for his child. While in the store, the business owner may see that the store is having a promotion for printers and remember that the printer in his shop's office has been performing poorly. Because the owner had only planned on making personal purchases while shopping for school supplies, he does not have his business credit card on hand. Nonetheless, the owner decides to go ahead and purchase the printer using his personal credit card. Although this may not seem like a significant event, actions such as this can have serious consequences for the business owner in terms of accounting costs, access to credit, tax liability, and legal responsibility.

Tracking financial records, regardless of a business owner's organizational skills and recordkeeping system, is an unending and often expensive undertaking. Failing to properly separate business and personal transactions makes the already tedious task of recordkeeping even more difficult and requires a significant outlay of resources, even for a relatively simple business.

If bookkeeping and accounting are done in-house, the business's owner or employees must spend valuable working hours sorting through transactions to determine whether they are of a personal or business nature. If outside bookkeepers and accountants are hired, they must spend, and bill, their time to organize and reconcile the relevant transactions. Regardless of whether the business owner spends her own time, utilizes employee time, or hires professionals, mixing business and personal transactions results in a significant outlay of time and money.

Beyond the accounting difficulties that arise from mixing personal and business transactions, combining personal and business transactions can have a significant effect on an entrepreneur's ability to access business and personal credit. Not only does maintaining separate business and personal accounts protect an entrepreneur's personal credit scores, but many experts also suggest that a company should have a business account unassociated with the business's owner's personal account so that the business may build its own credit profile. Indeed, one of a business's most important tools is its credit. When a business develops a credit identity separate from its owner's personal credit identity, the business builds its credit history and, in turn, has significantly more borrowing power than it otherwise would and may be able to access many times more credit than the owner could as an individual.

For an entity, the key to starting a business credit history is for its owner to avoid using personal credit to finance business purchases or expenses. Opening a business credit card allows the business to build credit. Unfortunately, a common mistake among business owners is using personal credit cards to finance business operations, which results in the business owner taking on personal responsibility for the business debt and running the risk of damaging his or her personal credit. Many entrepreneurs who rely on personal credit to run their businesses ultimately max out their own credit lines.

Additionally, maintaining separate business and personal accounts makes it significantly easier to identify business expense deductions for tax purposes. Mixing business and personal accounts makes it easy to overlook income and expenses that should appear on financial statements and tax returns. Furthermore, failure to maintain separate business and personal accounts can reduce the amount of acceptable deductions the IRS will allow.

Beyond the benefits of keeping payments for business and personal expenses separate, there are significant legal risks associated with paying for business expenses with personal funds and vice versa. If an owner fails to keep sufficient distance between her personal finances and her business finances, she may be held personally responsible for the company's debts. Said another way, if the business is sued and its finances are not clearly distinguishable from its owner's finances, the owner may be required to use her personal assets to pay the company's debts. Thus, an owner who fails to keep her business and personal finances separate risks losing her personal assets if the business fails.

Despite the obvious importance of separating business and personal finances, many business owners charge all business and personal expenses to a single credit card and attempt to manually reconcile the transactions to business or personal ledgers at a later date. As discussed above, however, this method is expensive as it requires a significant outlay of time to separate and organize the transactions. Furthermore, this method may expose the owner to unwanted financial and legal burdens, and if the card used is a personal card, prevents the business from developing credit.

Even those business owners forced to use a personal credit card for businesses purchases because of an inability to secure a business credit account will benefit from keeping a personal credit card strictly dedicated to business purchases. By maintaining a personal card dedicated to the business, the business owner will more accurately separate business and personal expenses, which will reduce accounting costs and allow the owner to more accurately identify the deductions to which he or she is entitled.

What is needed is a method and apparatus that allows a user to access multiple accounts, whether business or personal, with one card.

SUMMARY

As will be discussed below, a method and apparatus for associating multiple accounts with one account access card provides users with an efficient and simple means of managing their personal and business transactions with a single card. With one or more of the following disclosed embodiments, a user will have access to both personal and business accounts while only managing one card by keeping an account access card with a first side of the card associated with a personal account and a second side of the card associated with a business account. Therefore, if a business account and a personal account are each associated with a single, two-sided account access card, a user need only carry one card to have access to both accounts. Thus, an account access card user can easily maintain separate ledgers for personal and business accounts by keeping business and personal transactions separated.

Embodiments generally include an account access card. In one embodiment, the functions of the account access card include, but are not limited to, electronic funds transfer, identification, authentication, data storage, data transfer, and/or application processing. To perform these functions, according to various embodiments, the account access card is one or more of a smart card, a chip card, an integrated circuit card, an EMV card, a chip-and-PIN card, a chip-and-signature card, a magnetic stripe card, a radio frequency identification card, and/or any other account access card as described herein, as known in the art at the time of filing, and/or as developed thereafter.

In one embodiment, the account access card has a length, a width, a depth, a first side of the card, and a second side of the card. The account access card can be manufactured to one or more of a variety of physical dimensions. In one embodiment, the physical characteristics of the first side of the card and the second side of the card can be varied to facilitate distinguishing one side from another.

The account access card is manufactured from one or more of a number of materials, including, but not limited to, plastic, metal, wood, fabric, rubber, silicone, paper, and/or any other material as described herein, as known in the art at the time of filing, and/or as developed thereafter, according to one embodiment.

In various embodiments, the account access card includes one or more account identification components to enable the card to identify a user, access an account, receive information, and/or provide information. The one or more account identification components are disposed on the account access card, embedded into the material of the account access card, or otherwise carried by the account access card, in one embodiment. In various embodiments, the one or more account identification components store account identification data representing one or more accounts. In one embodiment, the account identification data provides access to one or more accounts.

In one embodiment, an account is a financial account. A financial account may include, but is not limited to, a credit account; a checking account; a line of credit; a stored value account; a debit account; a charge account; an ATM account; a stored-value account; a fleet account; a gift account; and a cash account. In one embodiment, account identification data provides access to a financial account and/or allows a user to initiate or accept an electronic funds transfer.

In various embodiments, one or more account identification components are disposed on one or more sides of the account access card. The one or more of account identification components may include, but are not limited to, embossing, a bar code, an account number, an integrated circuit, a microchip, a chip, a smart card chip, a microprocessor, a radio frequency identification chip, a radio frequency identification tag, a transponder, a re-programmable magnetic stripe, a magnetic stripe, a magnetic strip, a magstrip, and/or any other account identification component as known in the art at the time of filing or developed thereafter, according to various embodiments.

In one embodiment, one or more first account identification components are disposed on the first side of the card and are configured to store first account identification data to access to a first account. One or more second account identification components are configured to store second account identification data and are disposed on the second side of the card, the second account identification data allowing access to a second account, according to one embodiment.

In one embodiment, the first account is a personal financial account associated with a user and the second account is a business financial account associated with the user.

The one or more first account identification components configured to store first account identification data disposed on the first side of the card and the one or more second account identification components configured to store second account identification data disposed on the second side of the card provide a convenient means for a user to access multiple accounts from a single account access card. Because the first account can be accessed with the first side of the card and the second account can be accessed with the second side of the card, a user can access the first and second accounts via a single, two-sided account access card. Therefore, if a business account and a personal account are each associated with a single, two-sided account access card, a user need only carry one card to have access to both accounts. Thus, the present disclosure offers a solution to the problem of managing multiple cards in the process of keeping business and personal accounts separated.

In various embodiments, the account access card includes one or more user authentication components. A user authentication component may include, but is not limited to, a name, personal identification number ("PIN"), a Social Security number, a tax ID number, a driver's license number, a card security code, a signature strip, a signature, a hologram, an e-mail address, a text message number, a phone number, a physical address, a picture, a fingerprint reader, voice recognition technology, face recognition technology, an eye scanner, and/or any other user authentication components as known in the art at the time of filing or developed thereafter, according to various embodiments.

A user authentication component may help a third-party ensure that a card is valid. In one embodiment, a first user authentication component is disposed on first side of the card. In one embodiment, a second user authentication component is disposed on second side of the card.

Therefore using one of the disclosed embodiments of a method and apparatus for associating multiple accounts with one account access card, account access card users are provided an efficient and simple means of managing their personal and business transactions with a single card. By using one of the disclosed embodiments of a method and apparatus for associating multiple accounts with one account access card, an account access card user can easily maintain separate ledgers for personal and business accounts. By keeping an account access card with a first side of the card associated with a personal credit account and a second side of the card associated with a business credit account, a user will have access to both accounts while only managing one card.

By providing an alert to users of the account access card associated with multiple accounts, embodiments of the present disclosure allow for significant improvement to the fields of user experience, financial management, accounting, bookkeeping, data analytics, data collection, and data processing, according to one embodiment. As one illustrative example, by providing alerts to users if they attempt to use a personal financial account for a business transaction and/or if they attempt to use a business financial account for a personal transaction, embodiments of the present disclosure allows users to organize their business and personal transactions with fewer processing cycles and less communications bandwidth because the user is more likely to use appropriate accounts for transactions, thus reducing time that must be spent reconciling transactions to the correct ledger. This reduces processing cycles and communications bandwidth because the user does not redundantly use processing cycles and bandwidth to organize transactions. As a result, embodiments of the present disclosure allow for improved processor performance, more efficient use of memory access and data storage capabilities, reduced communication channel bandwidth utilization, and therefore faster communications connections.

In addition to improving overall computing performance, by assisting a user in identifying appropriate accounts for transactions, implementation of embodiments of the present disclosure represent a significant improvement to the field of automated financial management and, in particular, efficient use of human and non-human resources. As one illustrative example, by alerting a user when he or she attempts to use a personal financial account for a business transaction and/or attempts to use a business financial account for a personal transaction, the user can more easily comprehend and interact with financial records, reducing the overall time invested by the user to bookkeeping and accounting tasks. Consequently, using embodiments of the present disclosure, organizing financial transactions is less burdensome, less time consuming, and allows the user to dedicate more of his or her time to other activities or endeavors, while having confidence that the software system is adequately addressing his or her needs.

Figure 1A:
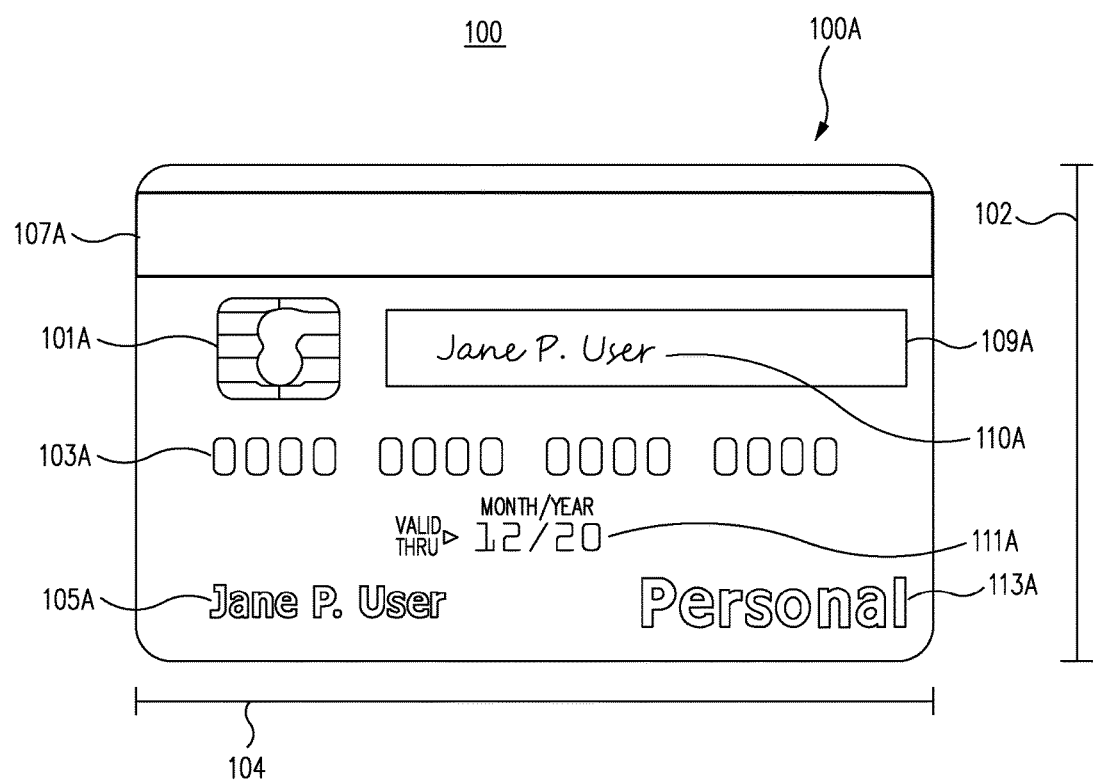
FIG. 1A is a perspective view of a first side of an account access card, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Embodiments generally include an account access card. As used herein, the term "account access card" includes, but is not limited to, any account access card configured for electronic funds transfer, identification, authentication, data storage, data transfer, and/or application processing. Herein the term "account access card" includes devices that allow a user to make or accept an electronic funds transfer. The term "account access card" includes, but is not limited to, a payment card; a financial card; a credit card; a debit card; a card linked to a checking account; a charge card; an automated teller machine ("ATM") card; a bank card; a loyalty card; a gift card; an electronic benefit transfer card; a stored-value card; a fleet card; a gift card; a cash card; a telephone card; a prepaid calling card; a membership card; an identity card; an access badge; a driver's license; a passport; a time card; an attendance tracking card; a hotel key card; a transportation ticket; a subway card; and/or a bus card.

As used herein, the term "user" includes, but is not limited to, any party, parties, entity, and/or entities using, or otherwise interacting with any of the devices, methods, or systems discussed herein. For instance, in various embodiments, a user can be, but is not limited to, a person, a commercial entity, an application, a service, and/or a computing system.

Figure 1B:
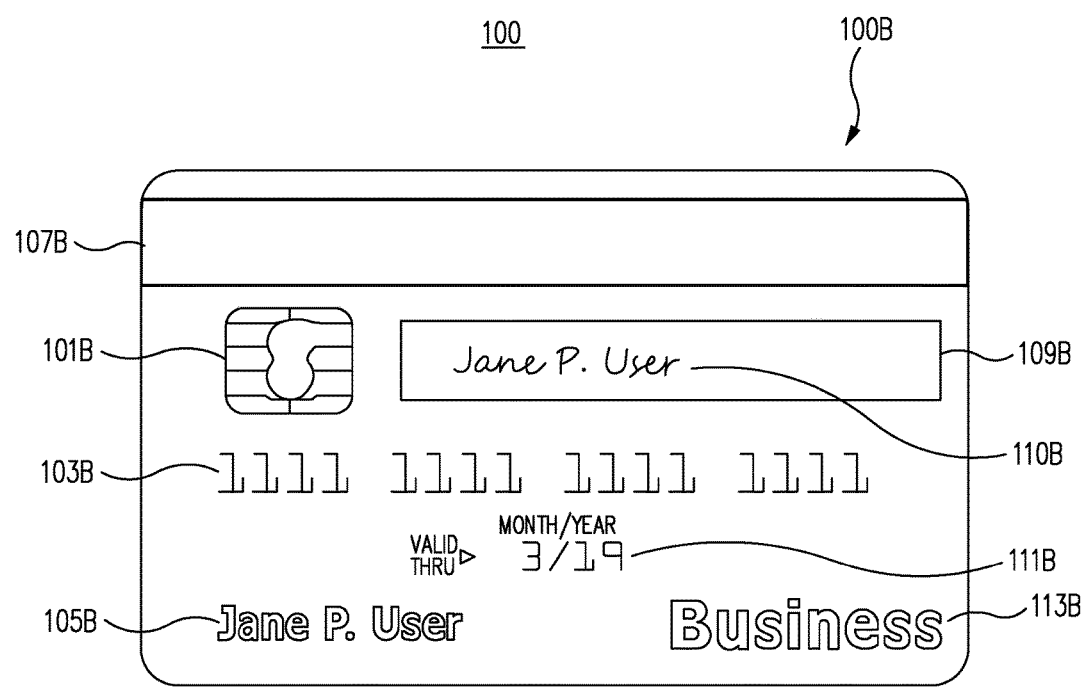
FIG. 1B is a perspective view of a second side of an account access card, in accordance with one embodiment.

Turning now to the drawings, FIGS. 1A and 1B are illustrations of one embodiment of an apparatus for associating multiple accounts with one account access card. Because a first account can be accessed with the first side of the card and a second account can be accessed with the second side of the card, a user can access two accounts via a single, two-sided account access card. Therefore, with one card, a user can access multiple accounts. Indeed, if a business account and a personal account are each associated with a single, two-sided account access card, a user need only carry one card to have access to both accounts. Thus, the present disclosure offers a solution to the problem of managing multiple cards in the process of keeping business and personal accounts separated.

In one embodiment, account access card 100 includes a length 102, a width 104, a depth (not depicted), a first side of the card 100A, and a second side of the card 100B. First side of the card 100A and second side of the card 100B, collectively depict account access card 100, in one embodiment.

In one embodiment, the account access card 100 can be manufactured to one or more of a variety of physical dimensions. In one embodiment, the length 102 is less than approximately 3 inches, the width 104 is less than approximately 4 inches, and the depth (not depicted) is less than approximately 0.25 inches. In one embodiment, account access card can be manufactured according to various credit card manufacturing standards. The length 102 is approximately 2.125 inches, according to one embodiment. In one embodiment, the width 104 is approximately 3.370 inches. In one embodiment, the length 102 and the width 104 are the same so that the account access card 100 has a square shape. In one embodiment the length 102 and the width 104 are different, so that the account access card 100 has a rectangular shape. In one embodiment, the account access card 100 is circular, an oval, triangular, or otherwise polygonal.

In one embodiment, the physical characteristics of the first side of the card 100A and the second side of the card 100B can be varied to facilitate distinguishing one side from another. In one embodiment, first side of the card 100A includes a first color and second side of the card 100B includes a second color. For example, first side of the card 100A may be blue and second side of the card 100B may be red. In one embodiment, first side of the card 100A includes a first texture and second side of the card 100B includes a second texture. For example, first side of the card 100A may be smooth and second side of the card 100B may be rough.

In one embodiment, first side of the card 100A includes a first embellishment and second side of the card 100B includes a second embellishment. In one embodiment, first side of the card 100A includes a first embellishment and second side of the card 100B does not include an embellishment. In one embodiment, first side of the card 100A does not include an embellishment and second side of the card 100B includes a second embellishment. In various embodiments, an embellishment includes, but is not limited to, an icon, a logo, a slogan, a trademark, a service mark, a drawing, and/or a picture.

In one embodiment, account access card 100 is manufactured from one or more of a number of materials. Materials from which account access card 100 can be manufactured include, but are not limited to, plastic, metal, wood, fabric, rubber, silicone, paper, and/or any other material as described herein, as known in the art at the time of filing, and/or as developed thereafter, according to one embodiment. Plastic may include, but is not limited to, polymers including polycarbonate, acrylonitrile butadiene styrene, polyvinyl chloride, and/or polyethylene terephthalate based polyester. Metal may include, but is not limited to, titanium, palladium, gold, steel, silver, and/or carbon.

Account access card 100 is configured to provide one or more of a variety of functions, according to one embodiment. In one embodiment, the functions of account access card 100 include, but are not limited to, electronic funds transfer, identification, authentication, data storage, data transfer, and/or application processing. To perform these functions, according to various embodiments, account access card 100 is one or more of a smart card, a chip card, an integrated circuit card, an EMV card, a chip-and-PIN card, a chip-and-signature card, a magnetic stripe card, and a radio frequency identification card.

The account access card 100 includes one or more account identification components to enable the card to identify a user, access an account, receive information, and/or provide information, according to one embodiment. In one embodiment, account access card 100 includes account identification components 101A, 103A, 107A, 101B, 103B, and 107B. The account identification components 101A, 103A, 107A, 101B, 103B, and 107B are examples of account identification components disposed on account access card 100, embedded into the material of account access card 100, or otherwise carried by account access card 100. In various embodiments, one or more account identification components 101A, 103A, 107A, 101B, 103B, and 107B store account identification data representing one or more accounts. In one embodiment, account identification data provides access to one or more accounts.

In one embodiment, an account is a financial account. A financial account may include, but is not limited to, a credit account; a checking account; a line of credit; a stored value account; a debit account; a charge account; an ATM account; a stored-value account; a fleet account; a gift account; and a cash account.

In one embodiment, account identification data provides access to a financial account and/or allows a user to initiate and/or accept an electronic funds transfer.

The one or more account identification components 101A, 103A, 107A, 101B, 103B, and 107B are means for identifying an account and/or are account identification means, and include, but are not limited to, embossing, a bar code, an account number, an integrated circuit, a microchip, a chip, a smart card chip, a microprocessor, a radio frequency identification chip, a radio frequency identification tag, a transponder, a re-programmable magnetic stripe, a magnetic stripe, a magnetic strip, a magstrip, and/or any other account identification component as known in the art at the time of filing or developed thereafter, according to one embodiment.

In various embodiments, one or more of account identification components 101A, 103A, 107A, 101B, 103B, and 107B may operate via contact, i.e., the account identification component may make physical contact with a reader; or an account identification component may operate via contactless technology, e.g., using radio frequency or magnetic field technology.

In various embodiments, one or more first account identification components 101A, 103A, 107A, 101B, 103B, and 107B are disposed on first side of the card 100A and are configured to store first account identification data to access to a first account. In various embodiments, one or more second account identification components 101A, 103A, 107A, 101B, 103B, and 107B are configured to store second account identification data and are disposed on second side of the card 100B, the second account identification data allowing access to a second account.

In one embodiment, the first account is a personal financial account associated with a user and the second account is a business financial account associated with the user.

In one embodiment, the first account and the second account are both personal financial accounts associated with the user. In one embodiment, the first account and the second account are both business financial accounts, e.g, business financial accounts for different businesses, associated with the user. In one embodiment, account access card 100 includes a first embellishment 113A indicating the word "Personal" and disposed on first side of the card 100A. In one embodiment, a second embellishment 113B indicates the word "Business" and is disposed on second side of the card 100B.

In one embodiment, one or more first account identification components 101A, 103A, and 107A configured to access a personal financial account and a second embellishment 113B indicating the word "Business" are disposed on first side of the card 100A. One or more second account identification components 101B, 103B, and 107B are configured to access a business financial account and a first embellishment 113A indicating the word "Personal" are disposed on second side of the card 100B. In one embodiment, by disposing the first embellishment 113A indicating "Personal" on second side of the card 100B and the second embellishment 113B indicating "Business" on first side of the card 100A, the embellishments are disposed on the side opposite their respective account identification components. Thus, if the user must present the one or more first identification components configured to access a personal financial account first side of the card down to a component reader, the first embellishment indicating the word "Personal" will be visible to the user. This configuration will assist the user in understanding which account the user is accessing.

In one embodiment, account access card 100A includes first account identification components 101A, 103A, and 107A disposed on first side of the card 100A and second account identification components 101B, 103B, and 107B disposed on second side of the card 100B.

First account identification component 101A is a first chip configured to store first account identification data and is disposed on first side of the card 100A. Second account identification component 101B is a second chip configured to store second account identification data and is disposed on second side of the card 100B.

In one embodiment, a chip must make contact with a chip reader, which is used to facilitate communications between the chip and a computing system. This "contact chip" includes metal plated contact pads that provide electrical connectivity with the chip reader. For example, a contact chip may be inserted into a chip reader, which, in one embodiment, facilitates communication between the contact chip and a point-of-sale system.

First account identification component 103A is a first account number configured to store first account identification data and is disposed on first side of the card 100A. Second account identification component 103B is a second account number configured to store second account identification data and is disposed on second side of the card 100B.

Most national credit-card systems utilize a numbering system called ANSI Standard X4.13-1983. The first digit in a credit card number usually signifies its system (e.g. Visa, MasterCard, etc.). The remaining digits may signify the currency, bank number, bank country, bank account number, etc.

First account identification component 107A is a first magnetic stripe configured to store first account identification data and is disposed on first side of the card 100A, according to one embodiment. In one embodiment, second account identification component 107B is a second magnetic stripe configured to store second account identification data and is disposed on second side of the card 100B.

In one embodiment, a magnetic stripe is made up of magnetic particles on a strip of magnetic material. Data is stored on the magnetic stripe by modifying the magnetism of the magnetic particles and the magnetic stripe is read by swiping it past a magnetic reader to make contact with the magnetic reader's head.

In one embodiment, account access card 100 includes user authentication components 105A, 109A, 111A, 105B, 109B, and 111B. The user authentication components 105A, 109A, 111A, 105B, 109B, and 111B are means for authenticating accounts, according to one embodiment. A user authentication component and/or means for authenticating accounts include, but are not limited to, one or more of a name, a business name, a business title, a personal identification number ("PIN"), a Social Security number, a tax ID number, a driver's license number, a card security code, a signature strip, a signature, a hologram, an e-mail address, a text message number, a phone number, a physical address, a picture, a fingerprint reader, voice recognition technology, face recognition technology, an eye scanner, and/or any other user authentication component as known in the art at the time of filing or developed thereafter.

In one embodiment, one or more of user authentication components 105A, 109A, 111A, 105B, 109B, and 111B help a third-party ensure that a card is valid. For example, a security code may be used to authenticate an online credit card transaction because a user who can provide the security card associated with a credit card is likely in possession of the physical card. If the security code provided by the user does not match the code on file with the issuer, the online credit card transaction cannot be authenticated. As another example, a hologram may be disposed on account access card 100 to improve security of the card because holograms are extremely challenging to counterfeit. Thus, an account access card 100 with an accurate hologram is likely authentic.

First user authentication component 105A is a first display of the user's name and is disposed on first side of the card 100A. Second user authentication component 105B is a second display of the user's name and is disposed on second side of the card 100B. A merchant or other organization may request another form of user identification (e.g., a driver's license, a school identification card, a passport, etc.), in combination with the first user authentication component 105A and/or the second user authentication component 105B to verify that the holder of the account access card 100 is the person or organization identified by the first user authentication component 105A and/or the second user authentication component 105B.

In one embodiment, the first user authentication component 105A is different than the second user authentication component 105B. For example, in one embodiment, the first user authentication component 105A is the user's individual name and is disposed on first side of the card 100A while the second user authentication component 105B is the user's business's name and is disposed on second side of the card 100B. In one embodiment, a user authentication component includes the user's name and/or the user's position within a business.

First user authentication component 109A is a first signature strip and is disposed on first side of the card 100A. Second user authentication component 109B is a second signature strip and is disposed on second side of the card 100B. The signature strip is made from a different material that the card, to reduce the likelihood of the signature being smeared off and/or to increase the readability of the signature, in one embodiment.

First user authentication component 110A is a first signature and is disposed on first side of the card 100A. Second user authentication component 110B is a second signature and is disposed on second side of the card 100B.

First user authentication component 111A is a first expiration date and is disposed on first side of the card 100A. Second user authentication component 111B is a second expiration date and is disposed on second side of the card 100B. In one embodiment, once the expiration date is reached, one or more of the user authentication components no longer provide access to the associated account. In another example, once the expiration date is reached, the one or more user authentication components no longer provide access to the one or more identification accounts and to a building.

In one embodiment, the first expiration date of first user authentication component 111A and the second expiration date of second user authentication component 111B are different, which allows first user authentication component 111A to be used even after second user authentication component 111B has expired, and vice versa. In one embodiment, the first expiration date of first user authentication component 111A and the second expiration date of second user authentication component 111B are the same, which encourages the user to discard and/or destroy the card once the expiration date is reached.

Figure 2A:
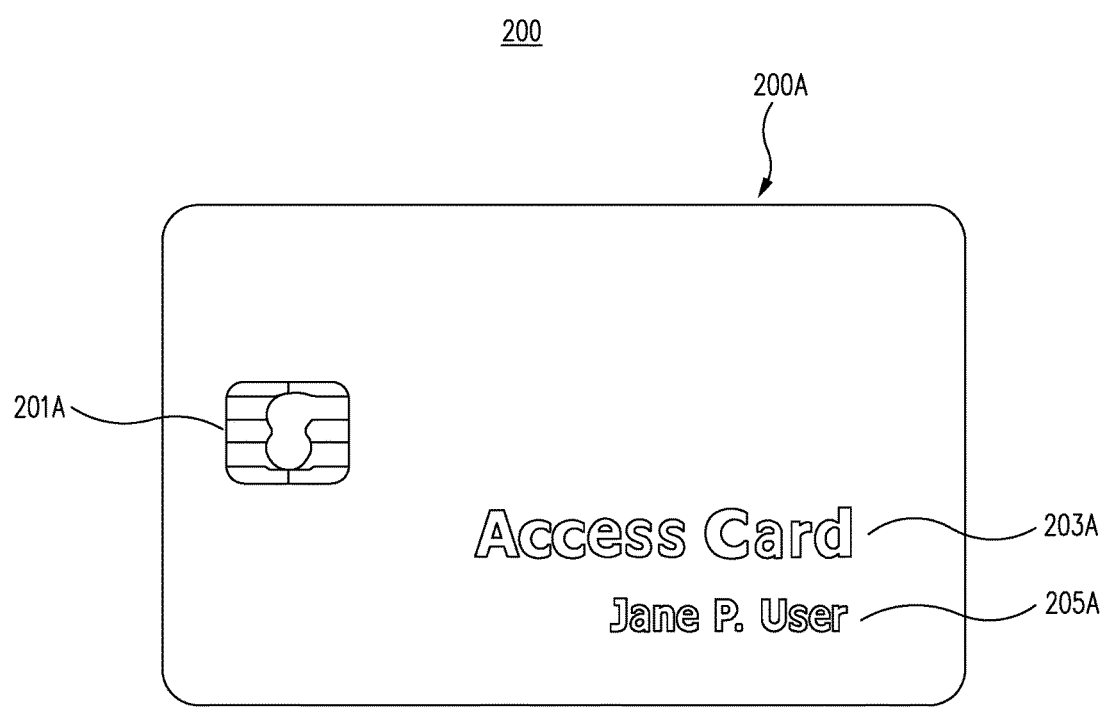
FIG. 2A is a perspective view of a first side of an account access card, in accordance with one embodiment.
Figure 2B:
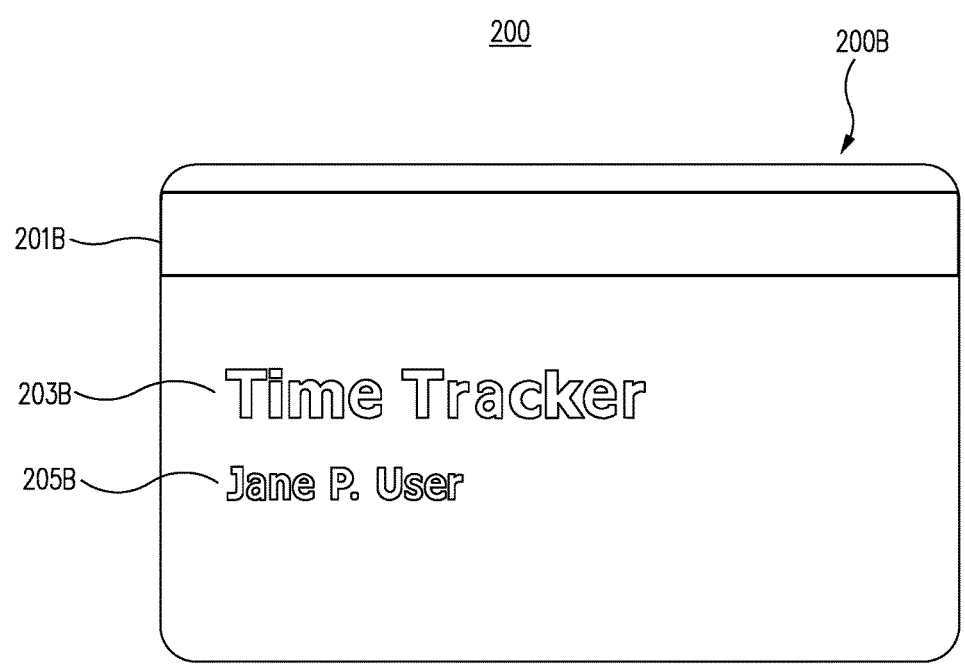
FIG. 2B is a perspective view of a second side of an account access card, in accordance with one embodiment.

Turning now to FIGS. 2A and 2B, in one embodiment, first side of the card 200A and second side of the card 200B, collectively depict account access card 200. Account access card 200 includes a first side of the card 200A, and a second side of the card 200B.

Account access card 200 is configured to provide one or more of a variety of functions, according to one embodiment. In one embodiment, the functions of account access card 200 include, but are not limited to, identification, authentication, data storage, data transfer, and/or application processing.

The account access card 200 includes one or more account identification components to enable the card to identify a user, access an account, receive information, and/or provide information, according to one embodiment. In one embodiment, account access card 200 includes account identification components 201A and 201B. The account identification components 201A and 201B are examples of account identification components disposed on account access card 200, embedded into the material of account access card 200, or otherwise carried by account access card 200. In various embodiments, one or more account identification components 201A and 201B store account identification data representing one or more accounts. In one embodiment, account identification data provides access to one or more accounts.

In one embodiment, first account identification component 201A stores first account identification data representing one or more first accounts. In one embodiment, the first account identification data provides access to the one or more first accounts. In one embodiment, the one or more first accounts are identification accounts.

In one embodiment, first account identification component 201A is a chip and is configured to access a building access account. By making contact between the chip and a chip reader, the user is able to access a secure building.

In one embodiment, second account identification component 201B stores second account identification data representing one or more second accounts. In one embodiment, the second account identification data provides access to the one or more second accounts. In one embodiment, the one or more second accounts are time tracking accounts.

In one embodiment, second account identification component 201B is a magnetic stripe and is configured to access a time tracking account. By swiping the magnetic stripe of second account identification component 201B past a magnetic reader, the user is able to access a time tracking account, which, in one embodiment, allows the user to clock-in and/or out for work.

In one embodiment, account access card 200 includes embellishments 203A and 203B. In one embodiment, account access card 200 includes a first embellishment 203A indicating the words "Access Card" and disposed on first side of the card 200A. In one embodiment, a second embellishment 203B indicates the words "Time Tracker" and is disposed on second side of the card 200B.

In one embodiment, account access card 200 includes user authentication components 205A and 205B. First user authentication component 205A is a first display of the user's name and is disposed on first side of the card 200A. Second user authentication component 205B is a second display of the user's name and is disposed on second side of the card 200B.

Figure 3:
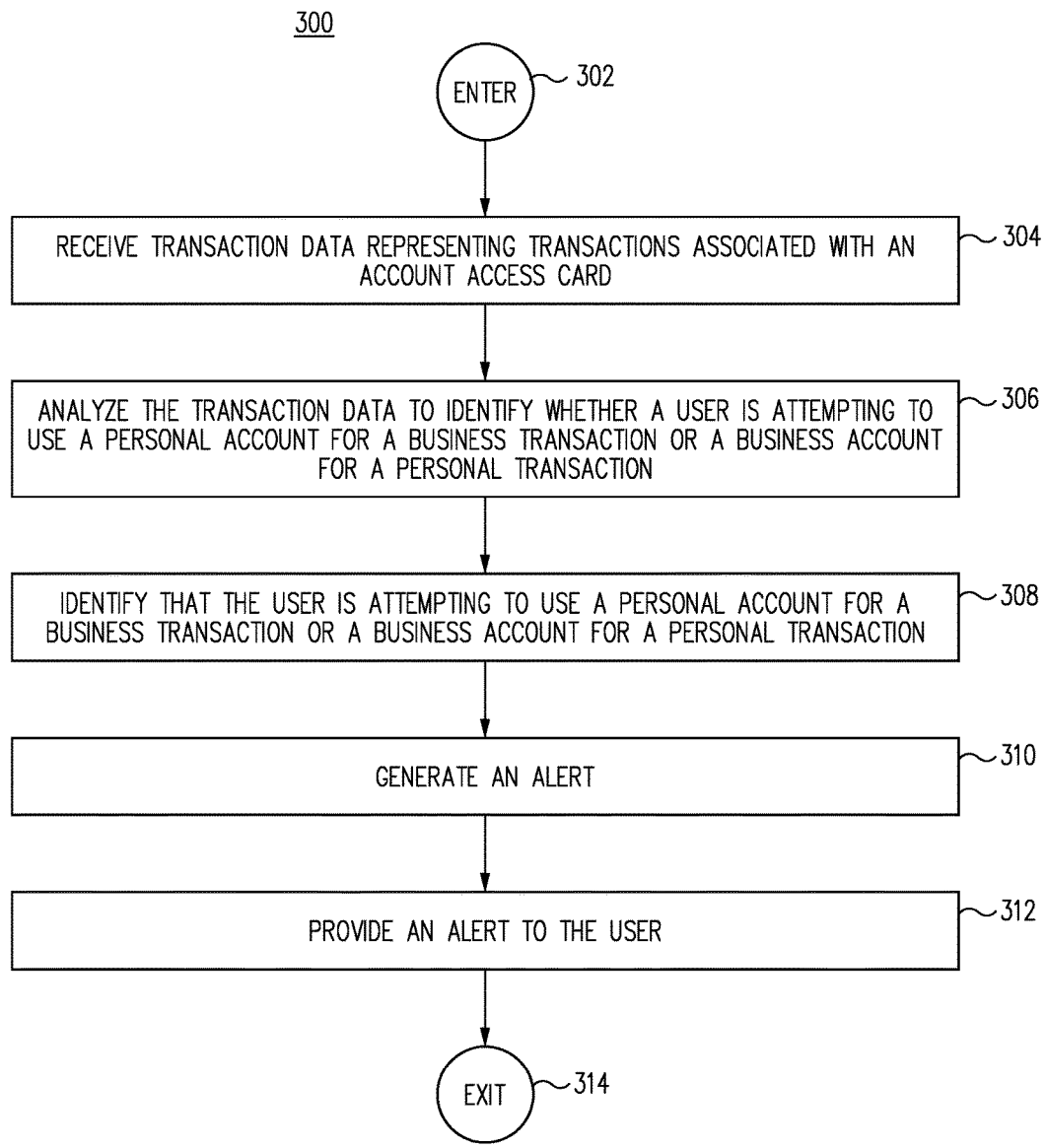
FIG. 3 is a flow diagram for alerting a user that the user is attempting to use a personal account for a business expense or a business account for a personal expense, in accordance with one embodiment.

Moving now to FIG. 3, FIG. 3 illustrates a flow diagram of a process 300 for alerting a user of an attempt to use a personal financial account for a business transaction or a business financial account for a personal transaction. Process 300 for alerting a user of an attempt to use a personal financial account for a business transaction or a business financial account for a personal transaction begins at ENTER OPERATION 302 of FIG. 3 and process flow proceeds to RECEIVE TRANSACTION DATA REPRESENTING TRANSACTIONS ASSOCIATED WITH AN ACCOUNT ACCESS CARD OPERATION 304.

At RECEIVE TRANSACTION DATA REPRESENTING TRANSACTIONS ASSOCIATED WITH AN ACCOUNT ACCESS CARD OPERATION 304, the process includes receiving, with a computing system, transaction data representing transactions associated with an account access card.

The term "computing system" includes, but is not limited to, a computing entity; a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein. In addition, the term "computing system" includes, but is not limited to, systems made up of multiple: computing entities; virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, transaction data includes data indicating current and historical financial transactions conducted by the user. In one embodiment, transaction data associated with the account access card is obtained from one or more data processing systems.

In various embodiments, the transaction data includes, but is not limited to: data indicating the account access card used to conduct financial transactions; data indicating the account associated with the account access card used to conduct financial transactions; data indicating the location of the financial transactions; data indicating the date of the financial transactions; and/or any other financial management and/or financial transaction data obtained from one or more sources of financial management and/or financial transaction data associated with the user such as, but not limited to computing system implemented, and/or online, and/or web-based, personal and/or business software systems.

As used herein, the term software system includes, but is not limited to the following: computing system implemented, and/or online, and/or web-based, personal and/or business point-of-sale systems, services, packages, programs, modules, or applications; computing system implemented, and/or online, and/or web-based, personal and/or business financial management systems, services, packages, programs, modules, or applications; computing system implemented, and/or online, and/or web-based, personal and/or business financial transaction management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; computing system implemented, and/or online, and/or web-based, personal and/or business tax preparation systems; and various other personal and/or business electronic data management systems, services, packages, programs, modules, or applications, whether known at the time of filing or as developed later.

Specific examples of software systems include, but are not limited to the following: Mint™, available from Intuit, Inc. of Mountain View, Calif.; Mint Online™, available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Intuit Tax Online™ available from Intuit, Inc. of Mountain View, Calif.; TurboTax™ available from Intuit, Inc. of Mountain View, Calif.; TurboTax Online™ available from Intuit, Inc. of Mountain View, Calif.; and/or various other software systems discussed herein, and/or known to those of skill in the art at the time of filing, and/or as developed after the time of filing.

After receiving transaction data representing transactions associated with an account access card at RECEIVE TRANSACTION DATA REPRESENTING TRANSACTIONS ASSOCIATED WITH AN ACCOUNT ACCESS CARD OPERATION 304, process flow proceeds to ANALYZE THE TRANSACTION DATA TO IDENTIFY WHETHER A USER IS ATTEMPTING TO USE A PERSONAL ACCOUNT FOR A BUSINESS TRANSACTION OR A BUSINESS ACCOUNT FOR A PERSONAL TRANSACTION OPERATION 306.

In one embodiment, analyzing the transaction data to identify whether the user is attempting to use a personal account for a business transaction or a business account for a business transaction includes tracking the characteristics of transactions for which the user typically uses a personal account and/or the transactions for which the user typically uses a business account and then flagging a transaction that does have the characteristics of a transaction associated with the relevant account.

At ANALYZE THE TRANSACTION DATA TO IDENTIFY WHETHER A USER IS ATTEMPTING TO USE A PERSONAL ACCOUNT FOR A BUSINESS TRANSACTION OR A BUSINESS ACCOUNT FOR A PERSONAL TRANSACTION OPERATION 306, analyzing the transaction data includes applying, with a computing system, transaction data to a predictive model to cause the predictive model to generate predictive output data.

After analyzing the transaction data to identify whether the user is attempting to use a personal account for a business transaction or a business account for a personal transaction at ANALYZE THE TRANSACTION DATA TO IDENTIFY WHETHER A USER IS ATTEMPTING TO USE A PERSONAL ACCOUNT FOR A BUSINESS TRANSACTION OR A BUSINESS ACCOUNT FOR A PERSONAL TRANSACTION OPERATION 306, process flow proceeds to IDENTIFY THAT THE USER IS ATTEMPTING TO USE A PERSONAL ACCOUNT FOR A BUSINESS TRANSACTION OR A BUSINESS ACCOUNT FOR A PERSONAL TRANSACTION OPERATION 308.

After identifying that the user is attempting to use a personal account for a business transaction or a business account for a personal transaction at IDENTIFY THAT THE USER IS ATTEMPTING TO USE A PERSONAL ACCOUNT FOR A BUSINESS TRANSACTION OR A BUSINESS ACCOUNT FOR A PERSONAL TRANSACTION OPERATION 308, process flow proceeds to GENERATE AN ALERT OPERATION 310.

At GENERATE AN ALERT OPERATION 310, alert data, representing an alert, is generated if the predictive output data indicates that the user is attempting to use a personal account for a business transaction or a business account for a personal transaction.

In one embodiment, at GENERATE AN ALERT OPERATION 310, an alert is generated to warn the user that improper account access has been attempted. In one embodiment, an improper account access attempt occurs when a user attempts to use a personal account for a business transaction or a business account for a personal transaction.

After an alert is generated at GENERATE AN ALERT OPERATION 310, process flow proceeds to PROVIDE AN ALERT TO THE USER OPERATION 312.

In one embodiment, at PROVIDE AN ALERT TO THE USER OPERATION 312, an alert is provided to the user. In one embodiment, an alert is a warning that the user is attempting or has attempted to use a personal account for a business transaction or a business account for a personal transaction. In one embodiment, the alert is transmitted to a mobile device that the user is presently using, such as a smartphone or other handheld device.

Herein, the term "mobile device" includes, but is not limited to the following: a mobile computing system; a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

In various embodiments, the alert is provided to the user via one or more of, but not limited to, e-mail, text message, SMS message, phone call, postal message, and/or through one or more software systems, and/or by any alert delivery system or mechanism as discussed herein, and/or as known in the art at the time of filing, and/or as made available/developed after the time of filing.

In one embodiment, the alert of PROVIDE AN ALERT TO THE USER OPERATION 312 includes details specifically focused on the improper account access attempt.

In one embodiment, the alert of PROVIDE AN ALERT TO THE USER OPERATION 312 includes details indicating the account the user attempted to use. In one embodiment, the alert of PROVIDE AN ALERT TO THE USER OPERATION 312 includes details about the attempted transaction, including a transaction amount, a transaction time, a transaction date, a transaction place, a transaction categorization (e.g., personal or business). In one embodiment, the alert of PROVIDE AN ALERT TO THE USER OPERATION 312 includes suggestions for an appropriate account for the attempted transaction. In one embodiment, the alert of PROVIDE AN ALERT TO THE USER OPERATION 312 includes a prompt to remind the user to update the ledgers associated with the personal and/or business account to properly categorize the transaction.

In one embodiment, the alert of PROVIDE AN ALERT TO THE USER OPERATION 312 includes a request that the user confirm the transaction data. In one embodiment, the alert of PROVIDE AN ALERT TO THE USER OPERATION 312 includes a request that the user confirm that the proper account was used to make a transaction. In one embodiment, the alert of PROVIDE AN ALERT TO THE USER OPERATION 312 includes a request that the user confirm that the improper account was used to make a transaction.

Consequently, using one of the disclosed embodiments of a method and apparatus for associating multiple accounts with one account access card, users are provided with an alert if they attempt to use a personal financial account for a business transaction and/or if they attempt to use a business financial account for a personal transaction.

After providing an alert to the user at PROVIDE AN ALERT TO THE USER OPERATION 312, process flow proceeds with EXIT OPERATION 314, where the process terminates, awaiting further transaction data to process.

By providing an alert to users of the account access card associated with multiple accounts, embodiments of the present disclosure allow for significant improvement to the fields of user experience, financial management, accounting, bookkeeping, data analytics, data collection, and data processing, according to one embodiment. As one illustrative example, by providing alerts to users if they attempt to use a personal financial account for a business transaction and/or if they attempt to use a business financial account for a personal transaction, embodiments of the present disclosure allows users to organize their business and personal transactions with fewer processing cycles and less communications bandwidth because the user is more likely to use appropriate accounts for transactions, thus reducing time that must be spent reconciling transactions to the correct ledger. This reduces processing cycles and communications bandwidth because the user does not redundantly use processing cycles and bandwidth to organize transactions. As a result, embodiments of the present disclosure allow for improved processor performance, more efficient use of memory access and data storage capabilities, reduced communication channel bandwidth utilization, and therefore faster communications connections.

In addition to improving overall computing performance, by assisting a user in identifying appropriate accounts for transactions, implementation of embodiments of the present disclosure represent a significant improvement to the field of automated financial management and, in particular, efficient use of human and non-human resources. As one illustrative example, by alerting a user when he or she attempts to use a personal financial account for a business transaction and/or attempts to use a business financial account for a personal transaction, the user can more easily comprehend and interact with financial records, reducing the overall time invested by the user to bookkeeping and accounting tasks. Consequently, using embodiments of the present disclosure, organizing financial transactions is less burdensome, less time consuming, and allows the user to dedicate more of his or her time to other activities or endeavors, while having confidence that the software system is adequately addressing his or her needs.

In accordance with one embodiment, an apparatus for associating multiple accounts with one account access card provides a convenient means for accessing multiple accounts using a single account access card. In one embodiment, the account access card has a length, a width, a depth, a first side, and a second side. In one embodiment, the length is less than approximately 3 inches, the width is less than approximately 4 inches, and the depth is less than approximately 0.25 inches. According to one embodiment, one or more first account identification components, which enable a user to access a first account, are disposed on the first side of the account access card body and store first account identification data representing first account identification associated with the first account.

In one embodiment, one or more second account identification components, which enable the user to access a second account, are disposed on the second side of the account access card body and store second account identification data representing second account identification associated with the second account.

In various embodiments, a method for associating multiple accounts with one account access card comprises providing an account access card body having a length, a width, a depth, a first side, and a second side. In one embodiment, the method includes providing first account identification data representing first account identification associated with a first account, the first account identification data enabling a user to access the first account. In one embodiment, the method includes providing second account identification data representing second account identification associated with a second account, the second account identification data enabling the user to access the second account.

In one embodiment, the method includes storing first account identification on the first side of the account access card body. According to one embodiment, the method includes storing second account data identification on the second side of the account access card body.

As discussed in more detail above, using the above embodiments, with little or no modification and/or input, there is considerable flexibility, adaptability, and opportunity for customization to meet the specific needs of various parties under numerous circumstances.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more other of the process steps and/or operations discussed herein. Consequently, the particular order and/or grouping of the process steps and/or operations discussed herein do not limit the scope of the invention as claimed below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. An apparatus comprising:
an account access card body having a length, a width, a depth, a first side, and a second side, wherein the length is less than approximately 3 inches, the width is less than approximately 4 inches, and the depth is less than approximately 0.25 inches;
one or more first account identification components that store first account identification data representing first account identification associated with a first account, the one or more first account identification components being disposed on the first side of the account access card body,
wherein the first account identification data enables a user to access the first account; and
one or more second account identification components that store second account identification data representing a building access authorization, the one or more second account identification components being disposed on the second side of the account access card body, the second account identification components including a radio frequency identification chip configured to grant a cardholder possessing the apparatus access to a secure building.

2. The apparatus of claim 1, wherein the first account is a financial account selected from a group of financial accounts consisting of:
a credit account;
a checking account;
a line of credit;
a stored value account;
a debit account;
a charge account;
an ATM account;
a stored-value account;
a fleet account;
a gift account; and
a cash account.

3. The apparatus of claim 1, wherein the one or more first account identification components include a first magnetic stripe storing the first account identification data.

4. The apparatus of claim 1, wherein the one or more second account identification components further include a second magnetic stripe, the second magnetic stripe storing the second account identification data.

5. The apparatus of claim 1, wherein the one or more first account identification components include a first chip, the first chip storing the first account identification data.

6. The apparatus of claim 1, wherein the one or more second account identification components include a second chip, the second chip storing the second account identification data.

7. The apparatus of claim 1, wherein the first side of the account access card body includes a first color and the second side of the account access card body includes a second color.

8. The apparatus of claim 1, wherein the first account is a personal financial account associated with the user.

9. The apparatus of claim 1, further comprising
one or more first user authentication components, the one or more first user authentication components being disposed on the first side of the account access card body; and
one or more second user authentication components, the one or more second user authentication components being disposed on the second side of the account access card body.

10. A method for associating multiple accounts with one account access card, the method comprising:
providing an account access card having a length, a width, a depth, a first side, and a second side, wherein the access card further has one or more first account identification components that store first account identification data representing first account identification associated with a first account, the one or more first account identification components being disposed on the first side of the account access card body, and the account access card further has one or more second account identification components that store second account identification data representing a building access authorization second account identification associated with a second account, the one or more second account identification components being disposed on the second side of the account access card body, the second account identification components including a radio frequency identification chip configured to grant a cardholder possessing the apparatus access to a secure building;
providing first account identification data representing first personal account identification associated with a first personal account,
wherein the first personal account is a personal financial account associated with a user,
wherein the first account identification data enables the user to access the first personal account;
providing second account identification data representing a building access authorization,
wherein the second account identification data enables the user to access the secure building;
storing first account identification on the first side of the account access card;
storing second account data identification on the second side of the account access card, the second account identification components including a radio frequency identification chip configured to grant a cardholder possessing the apparatus access to a secure building;
monitoring transaction data representing transactions associated with the account access card;
analyzing the transaction data to identify whether the user is attempting to use the first personal financial account for a business transaction;
determining that the user is attempting to use the personal financial account for a business transaction;
generating alert data representing an alert that the account access card is being used improperly; and
providing the alert data to the user to enable the user to cancel a pending financial transaction that is improper for the personal financial account, and to enable the user to complete a financial transaction that is proper for the personal financial account.

11. The method of claim 10, wherein the personal financial account is a financial account selected from a group of financial accounts consisting of:
a credit account,
a checking account,
a line of credit,
a stored value account,
a debit account,
a charge account,
an ATM account,
a stored-value account,
a fleet account,
a gift account, and
a cash account.

12. The method of claim 10, wherein providing the alert data to the user includes displaying the alert data as a message on an access card reader.

13. The method of claim 10, wherein providing the alert data to the user includes transmitting the alert data to a mobile computing device of the user.

14. The method of claim 10, wherein the first side of the account access card further includes a first account identification component including a first magnetic stripe, the first magnetic stripe storing the first account identification data.

15. The method of claim 10, wherein the second side of the account access card further includes a second magnetic stripe.

16. The method of claim 10, wherein the first side of the account access card includes a first color and the second side of the account access card includes a second color.

17. The method of claim 10, wherein the first side of the account access card includes a first texture and the second side of the account access card includes a second texture.

18. The method of claim 10, further comprising
providing first user authentication data representing first user authentication associated with the user,
wherein the first user authentication data enables authentication of the user;
providing second user authentication data representing second user authentication associated with the user,
wherein the second user authentication data enables authentication of the user;
storing the first user authentication data on the first side of the account access card; and
storing the second user authentication data on the second side of the account access card.

\* \* \* \* \*